Patented Feb. 6, 1934

1,945,658

UNITED STATES PATENT OFFICE 1,945,658

PRODUCTION OF COLORED PHOTOGRAPHIC PICTURES

Georg Roessler, Ludwigshafen - on - the - Rhine, Germany, assignor to Agfa Ansco Corporation, Binghamton, N. Y., a corporation of New York No Drawing. Application April 6, 1931, Serial No. 528,237, and in Germany April 19, 1930

8 Claims. (Cl. 95—88)

The present invention relates to the production of colored photographic pictures.

As a rule photographic silver pictures are converted into colored pictures by changing the silver into a compound such as silver copper ferrous cyanide, which has a mordant action on basic dyestuffs.

It is also known that silver pictures can be converted into colored pictures by employing leuco-compounds of dyestuffs. This is effected, either by converting the metallic silver of the picture, the film of which contains in suspension a water-insoluble leuco-compound, such as leuco-malachite green, into a mordant compound, such as silver copper thiocyanate and then, by means of an oxidizing agent, oxidizing the leuco-compound into the dyestuff, which fixes itself in the places previously occupied by the silver, but can be washed out of the bare places. Another process consists in converting the metallic silver of the picture into a compound which exerts an oxidizing action on the leuco-compound, so that a dyestuff is formed in the place of the silver and is fixed there by mordant action.

These processes, however, are cumbrous and often give unsatisfactory results, whilst, in addition, some of the dyestuffs suitable therefor are not very fast to light.

I have now found that silver pictures can be converted into colored pictures in a particularly simple manner by converting the metallic silver into silver halides of halogens other than fluorine, i. e. silver bromide, chloride or iodide, in the presence of water-soluble leuco-compounds of vat dyestuffs, which are insoluble in water and fast to light, such as acid esters, and their easily water-soluble salts, of the leuco-compounds of indigo dyestuffs or of those known in the trade as "Indanthrene" dyestuffs with inorganic polybasic acids, and simultaneously oxidizing the said esters, or their salts, to the corresponding dyestuffs. For the sake of brevity the water-soluble acid esters and the said salts thereof will be referred to in the following and in the claims as "water-soluble esters". The formation of the dyestuff proceeds simultaneously with the conversion of the metallic silver into a silver halide of the said nature, such as silver bromide, in coupled or catalytic reaction. (For "induced or coupled reaction" see Ullmann, Enzyklopädie der technischen Chemie, 1919, vol. 6, page 669.) In the absence of metals, the oxidation of the leuco-compounds by such oxidizing agents as are capable of dissolving the silver, or converting it into silver halide, as for example with the aid of a solution of ammonium persulphate, copper sulphate and potassium bromide, is an extremely slow process. If, however, a picture consisting of metallic silver, such as the silver of a photographic print, be introduced into the oxidizing solution in the presence of leuco-compounds as already herein defined, the metallic silver is oxidized and converted into a silver halide such as silver bromide at the same time with the deposition of the dyestuff insoluble in water in the places of the oxidized metallic silver particles. The oxidation mixture may be chosen from any of the mixtures usually employed for bleaching silver pictures, as for example in the bromoic process, provided the bleacher comprises a per-compound and a water-soluble halogen salt, as for example water-soluble salts of per-acids such as persulphates, perborates or percarbonates, or peroxides such as hydrogen peroxide, and water-soluble salts of hydrohalic acids of any kind, especially of the alkaline bases, i. e. ammonia alkali or alkaline earth metals, such as ammonium, potassium, sodium or calcium chlorides, bromides or also iodides, the most easily water-soluble salts being preferred; bleachers containing chromates and/or thiocyanates cannot be employed, since the chromates are capable of oxidizing the leuco-compounds of the vat-dyes even in the absence of metallic silver.

A silver print on any usual commercial material can therefore be transformed into a color print by placing it in a bath containing an agent for oxidizing the silver and the water-soluble leuco-compound.

The leuco-compound can also be incorporated during the preparation of the photographic emulsion with the binding medium for the photosensitive silver halide, which is a very simple matter on account of the solubility in water of the leuco-compounds employed, the emulsion being then poured onto the desired solid substratum such as cellulose derivative films, paper or glass. In such cases the silver print exposed and developed in the normal manner, is merely treated with the oxidizing agent, prior to washing.

The air stable salts of the acid esters of leuco-compounds with polybasic inorganic acids, such as the sulphuric esters or esters with other inorganic acids met with in commerce such as "Indigosols", see Color Index Supplement 1928, are particularly suitable water-soluble leuco-compounds for use with this invention.

The process is applicable both to monochrome and polychrome transparencies or prints according to the known processes for substractive two- or three-color prints, and therefore also to cinematograph films.

The following examples will further illustrate the nature of this invention, but the invention is not restricted to these examples.

*Example 1*

A silver print on gaslight paper is treated with a solution of the following composition:

15 cc. of a 5 per cent solution of ammonium persulphate,
2 cc. of a 10 per cent aqueous sulphuric acid solution,
1 to 2 cc. of a 10 per cent aqueous solution of copper sulphate,
15 to 20 drops of a 10 per cent aqueous solution of potassium bromide,
5 cc. of a 2 per cent solution of Indigosol pink, JR extra (Color Index Supplement 1928) and
50 to 70 cc. of distilled water.

At the end of from 4 to 6 minutes, the silver print is transformed into a pink color print which, after a short rinsing, is fixed with aqueous sodium thiosulphate solution in order to eliminate the silver halide formed and is then washed with water for half an hour.

*Example 2*

A silver bromide gelatine emulsion containing about 70 grams of gelatine and 20 grams of silver bromide per each litre of emulsion and intended for use for positive cinematograph films is incorporated with an addition of about 1 per cent of the sodium salt of the sulphuric ester from pentabrom-indigo dissolved in water, and the whole is poured onto the cellulose film. The film after exposure is developed in the usual way and treated, either before or after fixing, with the solution specified in Example 1, from which the leuco-compound alone is omitted. After the silver picture has been transformed into a blue colored picture, it is fixed and washed as in Example 1.

What I claim is:—

1. The process for the production of colored photographic pictures which comprises acting on a photographic silver picture with an aqueous bleacher solution comprising a water-soluble per-compound, selected from the group consisting of salts of per-acids and hydrogen peroxide, and a water-soluble salt of a hydrohalic acid of the group consisting of hydrogen chloride, bromide and iodide, in the presence of a water-soluble leuco-compound of a vat dyestuff.

2. The process for the production of colored photographic pictures which comprises acting on a photographic silver picture with an aqueous bleacher solution comprising a water-soluble per-compound, selected from the group consisting of salts of per-acids and hydrogen peroxide, and a water-soluble salt of a hydrohalic acid of the group consisting of hydrogen chloride, bromide and iodide, in the presence of a water-soluble sulphuric ester of a vat dyestuff.

3. The process for the production of colored photographic pictures which comprises acting on a photographic silver picture with an aqueous bleacher solution comprising a water-soluble per-compound, selected from the group consisting of salts of per-acids and hydrogen peroxide, and a water-soluble salt of a hydrohalic acid of the group consisting of hydrogen chloride, bromide and iodide, in the presence of a water-soluble ester of a vat dyestuff with a polybasic inorganic acid.

4. The process for the production of colored photographic pictures which comprises acting on a photographic silver picture with an aqueous bleacher solution comprising a water-soluble per-compound, selected from the group consisting of salts per-acids and hydrogen peroxide, and a water-soluble bromide in the presence of a water-soluble leuco-compound of a vat dyestuff.

5. The process for the production of colored photographic pictures which comprises acting on a photographic silver picture with an aqueous bleacher solution comprising a water-soluble salt of a per-acid and a water-soluble bromide, in the presence of a water-soluble leuco-compound of a vat dyestuff.

6. The process for the production of colored photographic pictures which comprises acting on a photographic silver picture with an aqueous bleacher solution comprising a water-soluble salt of a per-acid and a water-soluble bromide, in the presence of a water-soluble sulphuric ester of a vat dyestuff.

7. The process for the production of colored photographic pictures which comprises incorporating a photographic emulsion comprising a photosensitive silver halide with a water-soluble leuco-compound of a vat dyestuff, pouring the emulsion onto a solid substratum, exposing the resulting photosensitive layer, developing the picture and acting thereon with an aqueous bleacher solution comprising a water-soluble per-compound, selected from the group consisting of salts of per-acids and hydrogen peroxide, and a water-soluble salt of a hydrohalic acid of the group consisting of hydrogen chloride, bromide and iodide.

8. As a new article of manufacture a photosensitive layer deposited on a solid substratum and comprising a photosensitive silver halide and a water-soluble leuco-compound of a vat dyestuff.

GEORG ROESSLER.